United States Patent
Eckstein et al.

(10) Patent No.: US 10,239,791 B2
(45) Date of Patent: Mar. 26, 2019

(54) REFRACTORY CERAMIC BATCH COMPOSITION, USE OF A BATCH COMPOSITION OF THIS TYPE, AND METALLURGICAL MELTING VESSEL

(71) Applicant: Refractory Intellectual Property GmbH & Co. KG, Vienna (AT)

(72) Inventors: Wilfried Eckstein, Trofaiach (AT); Karl-Michael Zettl, Vienna (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 118 days.

(21) Appl. No.: 15/119,711

(22) PCT Filed: Jan. 22, 2015

(86) PCT No.: PCT/EP2015/051249
§ 371 (c)(1),
(2) Date: Aug. 17, 2016

(87) PCT Pub. No.: WO2015/158441
PCT Pub. Date: Oct. 22, 2015

(65) Prior Publication Data
US 2017/0050884 A1    Feb. 23, 2017

(30) Foreign Application Priority Data

Apr. 15, 2014 (EP) .................................... 14164782

(51) Int. Cl.
*C04B 35/043* (2006.01)
*C04B 35/057* (2006.01)
*C04B 35/66* (2006.01)
*F27D 1/00* (2006.01)
*F23M 5/00* (2006.01)
*C04B 35/622* (2006.01)

(52) U.S. Cl.
CPC .... *C04B 35/0435* (2013.01); *C04B 35/62222* (2013.01); *C04B 35/66* (2013.01); *F23M 5/00* (2013.01); *F27D 1/0006* (2013.01); *F27D 1/0009* (2013.01); *C04B 2235/321* (2013.01); *C04B 2235/3206* (2013.01); *C04B 2235/3208* (2013.01); *C04B 2235/3217* (2013.01); *C04B 2235/3272* (2013.01); *C04B 2235/3418* (2013.01); *C04B 2235/405* (2013.01); *C04B 2235/5472* (2013.01); *C04B 2235/6583* (2013.01); *C04B 2235/78* (2013.01); *C04B 2235/9676* (2013.01); *F23M 2900/05004* (2013.01)

(58) Field of Classification Search
CPC .... C04B 35/03; C04B 35/043; C04B 35/0435
See application file for complete search history.

(56) References Cited

U.S. PATENT DOCUMENTS

| | | | | |
|---|---|---|---|---|
| 3,293,053 A | * | 12/1966 | Alper | C04B 35/03 501/104 |
| 3,404,016 A | * | 10/1968 | Marschall | C04B 35/03 501/111 |
| 5,645,772 A | | 7/1997 | Petio et al. | |
| 8,257,485 B2 | * | 9/2012 | Colavito | C04B 35/043 106/685 |
| 2010/0189896 A1 | * | 7/2010 | Peschler | C04B 35/043 427/236 |

FOREIGN PATENT DOCUMENTS

| | | |
|---|---|---|
| AT | 353155 B | 10/1979 |
| CN | 1654415 A | 8/2005 |
| CN | 1837151 A | 9/2006 |
| EP | 2573058 A1 | 3/2013 |
| JP | H09142917 A | 6/1997 |
| TW | 200413270 A | 8/2004 |
| TW | 200427651 A | 12/2004 |

* cited by examiner

*Primary Examiner* — Karl E Group
(74) *Attorney, Agent, or Firm* — Medley, Behrens & Lewis, LLC

(57) ABSTRACT

The invention relates to a refractory ceramic batch for the production of an unformed refractory ceramic batch, the use of a batch of this kind for lining metallurgical melting vessels and also a metallurgical melting vessel which is lined with an unformed refractory ceramic product based on a batch of this kind.

13 Claims, No Drawings

REFRACTORY CERAMIC BATCH COMPOSITION, USE OF A BATCH COMPOSITION OF THIS TYPE, AND METALLURGICAL MELTING VESSEL

The invention relates to a refractory ceramic batch for the production of an unformed refractory ceramic product, the use of a batch of this kind for lining metallurgical melting vessels and also a metallurgical melting vessel which is lined with an unformed refractory ceramic product based on a batch of this kind.

A refractory ceramic batch is known to denote a mixture made up of one or a plurality of components, through which a refractory ceramic product can be produced by means of ceramic firing. The term "refractory ceramic product" within the meaning of the invention denotes in particular ceramic products with a working temperature of over 600° C. and preferably refractory materials in accordance with DIN 51060, in other words, materials with a pyrometric cone equivalent >SK 17. The pyrometric cone equivalent can be determined in particular according to DIN EN 993-12.

Refractory ceramic products are particularly also known in the form of unformed refractory ceramic products, in other words so-called "refractory masses".

Refractory masses are particularly also used to line metallurgical melting vessels.

Masses for lining or coating metallurgical melting vessels are particularly also known in the form of so-called hearth-construction or hearth-repair masses which are used for the refractory lining of melting vessels of this kind or else for repairing the lining of melting vessels of this kind.

Hearth-construction and hearth-repair masses for metallurgical melting vessels are usually made from natural magnesia rich in iron and chalk, for example alpine magnesia. Magnesia of this kind rich in iron and chalk is preferably used to produce a hearth-construction and hearth-repair mass, as this forms dicalcium ferrite (2 $CaO.Fe_2O_3$; $Ca_2Fe_2O_5$) even at a comparatively low temperature. This dicalcium ferrite forms a melting phase on the surface of the hearth-construction or hearth-repair mass facing the inside space of the metallurgical melting vessel, even at comparatively low temperatures. In this way, the mass lying thereunder and also the regions of the metallurgical melting vessel coated by the mass are protected from attack by the metal melt until the mass forms a dense sintered layer at higher temperatures which the metal melt is then barely able to penetrate.

Natural magnesia of this kind rich in iron and chalk is, however, not available in many cases. In such cases it is known in the art for synthetic magnesia rich in iron and chalk to be produced. In order to produce a synthetic magnesia of this kind rich in iron and chalk, magnesite low in iron, dolomite and an iron oxide carrier, for example rolling-mill scale, are pre-mixed, formed into briquettes and then burnt at a high temperature in a rotary furnace, wherein apart from synthetic magnesia, dicalcium ferrite in particular is also formed which is crucially important to the operation of the mass produced form the magnesia, as explained above.

However, a disadvantage of the production of this kind of synthetic magnesia rich in iron and chalk is, for example, that said magnesia has to be burnt in its own rotary furnace, as the furnace is contaminated by the raw materials used to produce the synthetic magnesia. For example, no natural magnesia low in iron and chalk can be burnt in a furnace of this kind, as it would be contaminated by the raw materials used to produce the synthetic magnesia rich in iron and chalk.

In addition, hearth-construction and hearth-repair masses are known in the art which are produced from a batch comprising sintered magnesia, burnt dolomite and, if necessary, iron oxide carriers. Burnt dolomite, however, has a strong tendency to hydratize, which means that a batch comprising burnt dolomite of this kind has only a limited storage life.

The problem addressed by the invention is that of providing a refractory ceramic batch based on magnesia low in iron to produce a refractory mass which has substantially the same properties as a mass which is produced on the basis of natural magnesia rich in iron and chalk. A further problem addressed by the invention is that of providing a batch based on magnesia low in iron to produce a mass which forms a molten layer even at comparatively low temperatures. A further problem addressed by the invention is that of providing a batch based on magnesia low in iron to produce a mass which forms a melt at comparatively low temperatures and forms a densely sintered layer at higher temperatures. A further problem addressed by the invention is that of providing a batch of this kind based on magnesia low in iron for the production of a mass for lining a metallurgical melting vessel which forms a melt at low temperatures and forms a dense sintered layer at high temperatures. A further problem addressed by the invention is that of providing a batch of this kind based on magnesia low in iron for the production of a mass which has a good storage life.

To solve these problems, a refractory ceramic batch is provided according to the invention for the production of an unformed refractory ceramic product which comprises the following raw materials:

one or a plurality of magnesia-based raw materials low in iron with a fraction in the region of 66 to 94% by mass;
one or a plurality of calcium carbonate-based raw materials with a fraction in the region of 5 to 30% by mass;
iron powder with a fraction in the region of 1 to 6% by mass.

Surprisingly, it has emerged according to the invention that an unformed refractory ceramic product, in other words a mass, can be produced by a refractory ceramic batch comprising the aforementioned raw materials, which exhibits substantially the same properties as a mass produced on the basis of natural magnesia rich in iron and chalk.

It has surprisingly emerged according to the invention that the use of iron powder combined with raw materials based on calcium carbonate in the batch according to the invention leads to the formation of dicalcium ferrite at temperatures from approximately 1000 to 1200° C. which creates a molten layer on the surface of the mass. In this way, the mass is protected from the furnace atmosphere or any metal melt already located in the furnace at such low temperatures, before the mass has formed a densely sintered monolithic body at higher temperatures. It has emerged according to the invention that iron powder reacts significantly better in this case with calcium carbonate-based raw materials than raw materials based on iron oxide, so that the creation of dicalcium ferrite to protect the mass is guaranteed.

It has been found according to the invention that the iron powder of the batch according to the invention reacts from about 600° C. to create iron (II) oxide (FeO). From about 1000° C. iron (III) oxide ($Fe_2O_3$) forms, particularly in an oxidizing atmosphere, from the iron (II) oxide or iron powder. In addition, the calcium carbonate of the calcium carbonate-based raw materials calcinates at these temperatures at the latest, so that the calcium carbonate in the calcium carbonate-based raw materials forms calcium oxide (CaO). The iron (II) oxide reacts with the magnesia in the magnesia-based raw materials to produce magnesia ferrite, while the iron (III) oxide particularly reacts with calcium oxide to produce dicalcium ferrite from about 1000° C. In this case, a greater amount of magnesia ferrite is formed in a more strongly reducing atmosphere, while more dicalcium ferrite is formed in a more strongly oxidizing atmosphere. From a temperature of about 1200° C., the dicalcium ferrite forms a melting phase on the surface of the mass which protects the mass lying thereunder which has not yet been densely sintered from attack by the furnace atmosphere or any metal melt already existing in the metallurgical melting vessel. At higher temperatures, in particular at temperatures from roughly 1400° C. to 1600° C., in other words the routine application temperatures of masses in metallurgical melting vessels, the mass forms a densely sintered refractory ceramic monolithic body which comprises, in particular, the periclase (MgO), wustite ((Mg,Fe)O) and CaO phases.

Another advantage of the batch according to the invention is that it exhibits exclusively stable phases, so that the batch has a very good storage life.

It may be particularly provided according to the invention that the fraction of iron in the magnesia-based raw materials low in iron, calculated as $Fe_2O_3$ and relative to the total mass of the raw materials low in iron, is below 1.5% by mass, so for example also below 1.4% by mass, 1.3% by mass, 1.2% by mass, 1.1% by mass, 1.0% by mass or 0.9% by mass. These figures relate to the total mass of raw materials low in iron, so that where different magnesia-based raw materials which are low in iron are used, individual raw materials from among these may also exhibit a fraction of iron, where necessary, which exceeds the aforementioned figure, insofar as the total mass of the magnesia-based raw materials low in iron lies below the aforementioned fractions of iron.

The same applies accordingly to the fraction of calcium in the magnesia-based raw materials low in iron. In this case, calcium, calculated as CaO and relative to the total mass of the raw materials low in iron, may be below 5% by mass, for example, so for example also below 4, 3 or 2% by mass.

Apart from iron ($Fe_2O_3$) and CaO, magnesia-based raw materials may for example comprise fractions of at least one of the following constituents: $Al_2O_3$ (preferably below 1 or 0.5% by mass), $SiO_2$ (preferably below 5, 4, 3, 2, 1% by mass) or $B_2O_3$ (preferably below 0.5 or 0.4% by mass, 0.3% by mass, 0.2% by mass or 0.1% by mass).

The fraction of magnesia (MgO) in the magnesia-based raw materials low in iron, again relative to the total mass of raw materials low in iron, is preferably above 90% by mass, so for example also above 91, 92, 93, 94, 95, 96, 97 or 98% by mass.

The figures provided here in % by mass relate in each case to the total mass of the refractory ceramic batch according to the invention, unless otherwise indicated in individual cases.

The magnesia-based raw materials low in iron may, for example, be present in the form of at least one of the following raw materials: fused magnesia or sintered magnesia.

The magnesia-based raw material or magnesia-based raw materials may be present in the batch in a fraction within the range of 66 to 94% by mass, so for example also in a fraction of at least 68, 70, 72, 73, 74, 75 or 76% by mass and, for example, in a fraction of maximum 93, 92, 91, 90, 89 or 88% by mass.

It may preferably be provided that the magnesia-based raw materials low in iron have a grain size of maximum 10 mm, in particular for example of maximum 9, 8, 7, 6 or 5 mm.

The calcium carbonate-based raw materials in the batch according to the invention may, for example, be present in the form of at least one of the following raw materials: limestone, marble or dolomite.

It may preferably be provided that the fraction of calcium carbonate in the calcium carbonate-based materials, relative to the total mass of the calcium carbonate-based raw materials, is above 90% by mass, so for example also above 91, 92, 93, 94, 95, 96, 97, 98 or 99% by mass. It may be provided, for example, that the calcium carbonate-based raw materials exist exclusively in the form of limestone.

The calcium carbonate-based raw material or the calcium carbonate-based raw materials may be present in the batch in a fraction in the range of 5 to 30% by mass, so for example also in a fraction of at least 6, 7, 8 or 9% by mass and, for example, in a fraction of maximum 29, 28, 27, 26, 25, 24, 23, 22 or 21% by mass.

It has emerged according to the invention that if possible only a small fraction of the calcium oxide required for the formation of dicalcium ferrite should be provided by dolomite. This is because additional magnesia is introduced into the batch via the dolomite, in that the magnesium carbonate in the dolomite is calcined into magnesia when the batch is used. To this extent, although it is possible to reduce the fraction of magnesia-based raw materials in the batch, the properties of a mass produced from the batch deteriorate as a result if the use of the batch not only involves calcination of the calcium carbonate-based raw materials, but additional calcination of the raw materials in the batch, in that magnesium carbonate from dolomite raw materials is calcined in addition. To this extent, it has proved advantageous for the fraction of dolomite in the batch according to the invention to be limited to a share of maximum 15% by mass.

To the extent that calcium carbonate-based raw materials are therefore also partially present in the form of dolomite, it may therefore be provided for example that they are only present in a small fraction alongside raw materials in the form of limestone. It may be provided, for example, that dolomite is only present in the batch in a fraction of maximum 15% by mass, so for example also in a fraction of maximum 14, 12, 10, 8, 6, 4, 3, 2 or 1% by mass.

The calcium carbonate-based raw materials preferably have a grain size of maximum 8 mm, so for example also of maximum 7, 6 or 5 mm. For example, it may further be provided that the calcium carbonate-based raw materials have a grain size of at least 1 mm, so for example also of at least 2 or 3 mm. The above figures on the grain size of calcium carbonate-based raw materials may relate to the entire fraction of these raw materials or, for example, also to a fraction of at least 90% by mass of the raw materials relative to the total mass of the calcium carbonate-based raw materials.

Iron powder may be present in the batch in a fraction in the range of 1 to 6% by mass, so for example also in a fraction of at least 1.2% by mass, 1.4% by mass, 1.6% by mass, 1.8 or 1.9% by mass, and in a fraction of maximum 5% by mass, 4% by mass, 3.8% by mass, 3.6% by mass, 3.4% by mass, 3.3% by mass, 3.2% by mass or 3.1% by mass.

For the reaction between iron (III) oxide and calcium oxide to produce dicalcium ferrite, it has proved advantageous for the iron (III) oxide to be present in the smallest possible particle size. This can be achieved in that the iron powder is present in the batch according to the invention in a small grain size, preferably in a grain size below 0.5 mm, so for example also in a grain size below 0.4 mm, 0.3 mm, 0.2 mm or 0.1 mm. These figures on the grain size of the metal powder may relate to the total mass of the iron powder or, for example, to a fraction of at least 90% by mass of the iron powder, relative to the total mass of the iron powder.

It has emerged according to the invention that the batch can have a very sensitive reaction to other components. For example, other components may in particular prevent or suppress the formation of dicalcium ferrite from iron oxide and calcium oxide. This applies in particular to carbon, for example, as this would react with the iron powder. It can therefore particularly be provided according to the invention that the fraction of carbon in the batch according to the invention is below 1% by mass.

As a general rule, it may be provided that the fraction of raw materials which are present in the batch alongside the magnesia-based raw materials provided according to the invention, the calcium carbonate-based raw materials and also the iron powder is below 10% by mass, particularly preferably below 9, 8, 7, 6 or 5% by mass.

In addition, it may be provided that the total mass of the oxides $SiO_2$ and $Al_2O_3$ in the batch is below 5% by mass, so for example also below 4, 3, or 2% by mass. The oxides $SiO_2$ and $Al_2O_3$ may, for example, be introduced into the batch particularly by impurities in the raw materials according to the invention.

The subject matter of the invention is furthermore the use of the batch according to the invention to line metallurgical melting vessels.

This use may, for example, take place with the proviso that the batch is prepared using at least one plasticizer into an unformed refractory ceramic product, in other words a mass, and the metallurgical melting vessel is then lined with the prepared unformed refractory ceramic product. To this extent, the batch according to the invention may in particular be used as a hearth-construction or hearth-repair mass.

The batch according to the invention may, however, also be used directly as a mass, without a plasticizer.

In order to produce an unformed refractory ceramic product, a mass in other words, from the batch, the raw materials of the batch may be intimately mixed with one another where necessary, possibly with the addition of a plasticizer.

The metallurgical melting vessel, which may be lined by the batch according to the invention, may in principle be any vessel used to hold a metal melt, for example a vessel which is used to hold a metal melt, for example an electric arc furnace in which a metal melt is produced by an electrical arc.

Lining of the metallurgical melting vessel in this case means the at least partial coating of a metallurgical melting vessel in areas which would come into contact with a metal melt, insofar as these would not be coated or lined with the unformed refractory ceramic product.

The subject matter of the invention is also a metallurgical melting vessel which is lined with an unformed refractory ceramic product, wherein the unformed refractory ceramic product is produced from a batch according to the invention.

In order to produce an unformed refractory ceramic product, in other words a mass, from the batch according to the invention, said mass may preferably be prepared with a plasticizer. A plasticizer of this kind may be an oil, for example, a dust-binding oil, for example at least one of the following oils: naphthene-based oil, diesel oil or sunflower oil. Plasticizer may be added to the batch in a fraction in the range of 0.1 to 3% by mass, for example, relative to the total mass of the batch without the plasticizer.

The batch according to the invention is preferably used dry as a mass, in other words with a plasticizer, if necessary, but without water.

The invention is explained in greater detail with the help of the following exemplary embodiments.

The subject matter of the exemplary embodiments are batches based on sintered magnesia low in iron which were obtained from a magnesite low in iron and chalk.

The sintered magnesia used in the exemplary embodiments has the following composition according to Table 1, wherein the figures shown in the right-hand columns are each in % by mass relative to the fraction of the oxide in each case relative to the total mass of the sintered magnesia.

TABLE 1

| Oxide | Fraction |
|---|---|
| MgO | 94.4 |
| $Fe_2O_3$ | 0.6 |
| $SiO_2$ | 2.2 |
| $Al_2O_3$ | 0.1 |
| CaO | 2.7 |

In the following Table 2, three sample batches A, B and C are specified for batches according to the invention based on the sintered magnesia according to Table 1, wherein the figures in the batch columns are each in % by mass relative to the fraction of the respective components of the total mass of the respective batch.

TABLE 2

| Raw material | Grain size | Batch A | Batch B | Batch C |
|---|---|---|---|---|
| Sintered magnesia | >5-8 mm | — | — | 15 |
| Sintered magnesia | >3-5 mm | 15 | 12 | 10 |
| Sintered magnesia | >1-3 mm | 17 | 13 | 11 |
| Sintered magnesia | >0.3-1 mm | 10 | 7 | 12 |
| Sintered magnesia | >0.1-0.3 mm | 40 | 40 | 10 |
| Sintered magnesia | >0-0.1 mm | 5 | 5 | 20 |
| Chalk | 1-5 mm | 10 | 20 | 20 |
| Iron powder | >0-0.3 mm | 3 | 3 | 2 |

The batches according to A and B are used as a hearth-repair mass (hot-repair mass) and the batch according to exemplary embodiment C as a hearth-construction mass (cold lining) for the lining of a metallurgical melting vessel.

For this purpose, the batches according to A and B were each additionally prepared with a plasticizer in a fraction of 0.5% by mass sunflower oil relative to the total mass of the respective batches without sunflower oil into a mass and the metallurgical melting vessel was then lined with the mass prepared in this manner.

The batch according to exemplary embodiment C was used directly as a mass without a plasticizer and the metallurgical melting vessel lined with the batch.

Further features of the invention emerge from the claims.

All of the features described in relation to the invention may be randomly combined with one another, individually or in combination.

The invention claimed is:

1. A refractory ceramic batch for the production of an unformed refractory ceramic product which comprises the following raw materials:
   1. 1 one or a plurality of magnesia-based raw materials low in iron with a fraction of 66 to 94% by mass;

1.2 one or a plurality of calcium carbonate-based raw materials with a fraction of 5 to 30% by mass; and 1.3 iron powder with a fraction of 1 to 6% by mass.

2. The batch according to claim 1, wherein the fraction of iron in the magnesia-based raw materials low in iron, calculated as $Fe_2O_3$ and relative to the total mass of the magnesia-based raw materials low in iron, is below 1.5% by mass.

3. The batch according to claim 1, wherein the fraction of calcium in the magnesia-based raw materials low in iron, calculated as CaO and relative to the total mass of the magnesia-based raw materials low in iron, is below 5% by mass.

4. The batch according to claim 1, wherein the fraction of magnesia in the magnesia-based raw materials low in iron, relative to the total mass of the magnesia-based raw materials low in iron, is above 90% by mass.

5. The batch according to claim 1 with magnesia-based raw materials low in iron in the form of at least one of the following raw materials: fused magnesia or sintered magnesia.

6. The batch according to claim 5, wherein the magnesia-based raw materials low in iron have a grain size of maximum 10 mm.

7. The batch according to claim 1, wherein the fraction of calcium carbonate in the calcium carbonate-based materials, relative to the total mass of the calcium carbonate-based raw materials, is above 90% by mass.

8. The batch according to claim 1 with calcium carbonate-based raw materials in the form of at least one of the following raw materials: limestone or dolomite.

9. The batch according to claim 8, wherein the calcium carbonate-based raw materials have a grain size of maximum 8 mm.

10. The batch according to claim 1, wherein the iron powder has a grain size of maximum 0.3 mm.

11. A method comprising:
  lining metallurgical melting vessels with unformed refractory ceramic product, wherein the unformed refractory ceramic product comprises:
  1.1 one or a plurality of magnesia-based raw materials low in iron with a fraction of 66 to 94% by mass;
  1.2 one or a plurality of calcium carbonate-based raw materials with a fraction of 5 to 30% by mass; and
  1.3 iron powder with a fraction of 1 to 6% by mass.

12. The method of claim 11, wherein a batch of the unformed refractory ceramic product is prepared using at least one plasticizer.

13. A metallurgical melting vessel which is lined with an unformed refractory ceramic product, wherein the unformed refractory ceramic product is produced by a batch which comprises the following raw materials:
  1.1 one or a plurality of magnesia-based raw materials low in iron with a fraction of 66 to 94% by mass;
  1.2 one or a plurality of calcium carbonate-based raw materials with a fraction of 5 to 30% by mass; and
  1.3 iron powder with a fraction of 1 to 6% by mass.

* * * * *